Patented Oct. 17, 1950

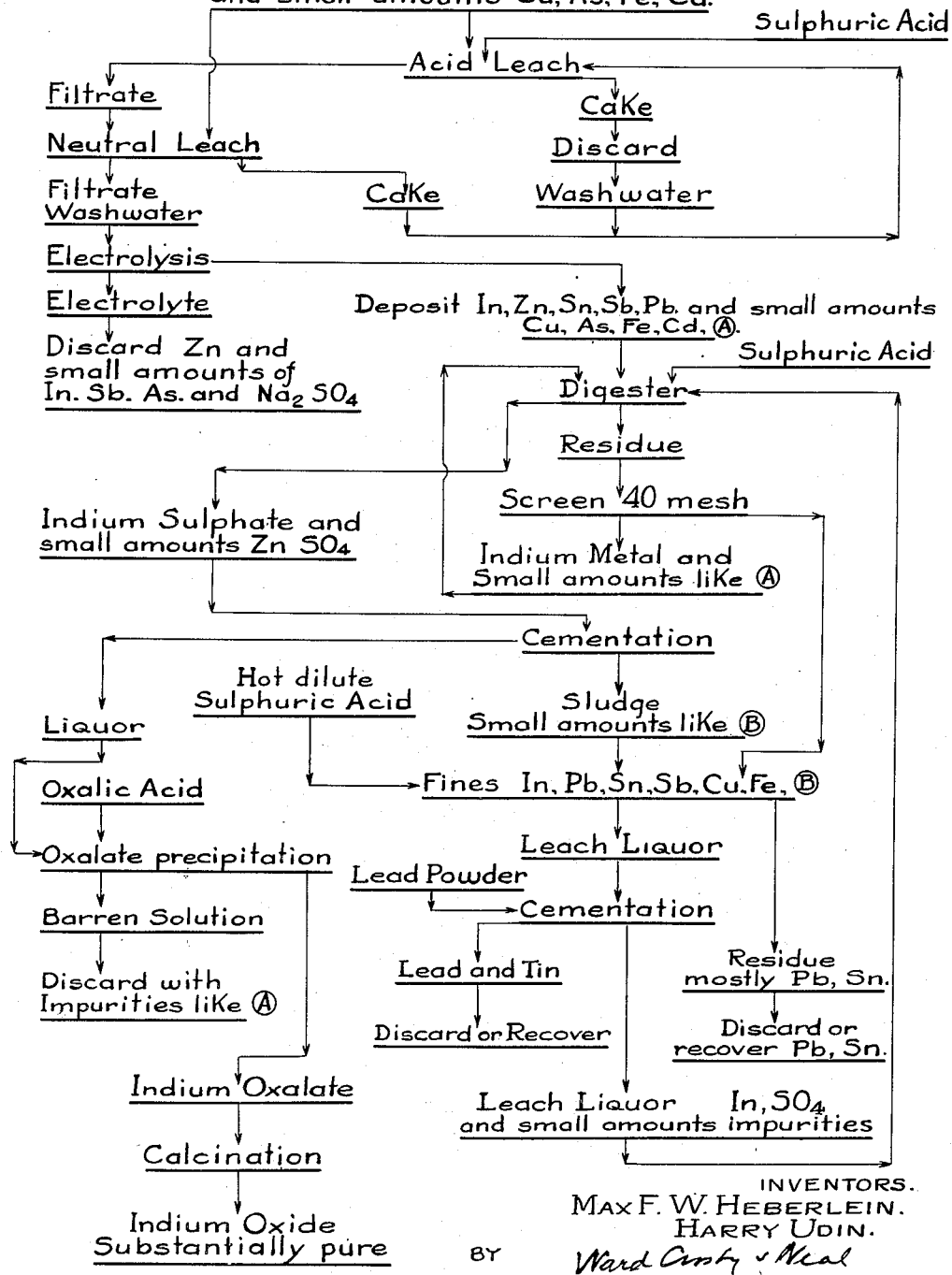

2,526,354

UNITED STATES PATENT OFFICE 2,526,354

PROCESS FOR PURIFYING INDIUM-CONTAINING MATERIAL

Max F. W. Heberlein, Rahway, N. J., and Harry Udin, Newtonville, Mass., assignors to The American Metal Company, Limited, New York, N. Y., a corporation of New York Application October 12, 1945, Serial No. 622,022

9 Claims. (Cl. 23—19)

This invention relates to processes for purifying indium-containing material. More particularly it relates to treatment of indium-containing residues as produced by United States Patent No. 2,378,848, issued June 19, 1945, to Max F. W. Heberlein, one of the co-inventors of the present application.

The principal object of the invention is to provide a simple, efficient process for treating such indium residues or similar impure material to remove at least the bulk of the impurities and to recover a relatively pure indium preferably in the form of a compound such as the oxalate or oxide.

The invention accordingly comprises the novel processes and steps of processes, specific embodiments of which are described hereinafter by way of example and in accordance with which we now prefer to practice the invention.

In accordance with the process of the above-mentioned patent, an impure indium material is obtained which is substantially insoluble in water. It contains large proportions of indium with sodium and sulfur—probably as a complex compound—and may also contain one or more of the following impurities: zinc, tin, lead, antimony and small amounts of copper, arsenic, cadmium and iron.

We have found in accordance with our present invention that this material or similar material obtained from other sources may be treated by the process of our invention to produce a relatively pure indium compound. As similar materials, we may employ fouled fused electrolytes containing indium or kettle drosses obtained by the practice of the invention of the copending application of Heberlein and Bierly, Serial No. 627,014, filed November 6, 1945, now Patent No. 2,521,217 issued Sept. 5, 1950.

Other basic materials such as neutralization and hydrolyzation precipitates of various indium-bearing solutions may also be treated in accordance with the process of our invention. If organic matter is present in such material, it is preferable to calcine same before use.

We have also found in accordance with our invention that indium-containing material such as mentioned above may be dissolved in sulfuric or other acid preferably in two counter-current stages until the pH concentration of the solution remains constant at about 1.4–1.6 (as discussed below), and then after filtering is electrolyzed to produce an impure deposit of indium containing substantially all of the impurities mentioned, but with a considerable proportion of the zinc eliminated, the latter passing into the electrolyte from which it may be recovered or the electrolyte discarded as desired. This deposit may be dissolved in sulfuric or other acid, leaving the residue containing a large proportion of the impurities. The solution obtained in this way may then be cemented with metallic indium to remove impurities other than zinc and cadmium. The cementation sludge may then be added to the above residue for further treatment. The liquor resulting from this cementation is then subjected to precipitation, preferably by oxalic acid, to produce substantially pure indium oxalate, which may then be calcined to produce substantially pure indium oxide. The combined residue and cementation sludge after removal of particles of indium metal which may be present from the above cementation may then be treated with hot acid, leaving a residue containing mostly lead or tin which may be discarded or treated to recover these last-named metals. The resulting solution containing indium, tin and possibly small amounts of lead may then be cemented by the addition of lead powder to produce a cementation sludge of tin and other heavy metals which may be discarded or treated to recover lead and tin. The remaining liquor containing substantially pure indium sulfate may then be returned to the acid bath in which the deposit of impure indium is dissolved to aid in the solution of a further lot of impure indium deposit.

In the accompanying flow sheet forming part of this specification, we show the process of the invention as we now prefer to practice it.

The flow sheet shows a process in which the starting material is a water leach residue from the practice of the above-mentioned Patent No. 2,378,848. This water leach residue contains an indium-sulfur compound and combined sodium, along with zinc, tin, antimony and lead and small amounts of copper, arsenic, iron and cadmium. This material is leached with sulfuric acid in two stages, viz., "neutral" leach and "acid" leach, to produce a filtrate and a cake. The latter may be discarded after washing with wash water, the wash water being returned to the acid leach. The filtrate is then added to a neutral leach to produce a further filtrate, a wash water and a cake, the cake being returned to the acid leach for further treatment. The filtrate and wash water are then electrolyzed to obtain a deposit which consists of indium with zinc, tin, antimony and lead as impurities with further small amounts of impurities including copper, arsenic, iron and cadmium. This deposit is designated on the flow sheet by the letter A. The depleted electrolyte from this electrolysis containing zinc and small amounts of indium, antimony and arsenic and sodium sulfate, may be discarded. Deposit A is then placed in a digester with sulfuric acid to form a solution consisting principally of indium sulfate with zinc sulfate and small amounts of other metals above-mentioned as contained therein. This indium sulfate is then cemented with indium metal to give a liquor and sludge. The liquor contains principally indium sulfate and a small amount of zinc sulfate with a small amount of impurities, the large proportion of impurities having been removed by the cementation process. To the liquor from the cementation, oxalic acid is added to produce indium oxalate with a small amount of zinc oxalate. This is calcined to produce substantially pure indium oxide containing about 98–99% indium oxide, the balance being substantially zinc oxide. The solution from this oxalic precipitation is a substantially barren solution containing zinc, some lead, and very small amounts of the other impurities mentioned in the deposit A above.

The solution of deposit A in sulfuric acid leaves a residue which is screened wet through a 40-mesh screen to remove particles of undissolved indium metal which are then returned to the digester in which the deposit A is being treated with sulfuric acid. The fines from this screening are then treated with hot dilute sulfuric acid. To these fines are added the sludge from the indium cementation above. These fines consist principally of indium, tin, lead, antimony, copper and iron, and are designated on the flow sheet as fines B. Upon treatment with hot sulfuric acid, a leach liquor is formed and a residue, the latter consisting mostly of lead and tin which may be discarded or treated to recover the last-mentioned metals. The leach liquor is then cemented by addition thereto of lead powder whereby tin and other impurities in solution are cemented out. This sludge may then be discarded or treated to recover lead and tin. The leach liquor from this lead powder cementation contains principally indium sulfate and very small amounts of impurities such as mentioned under fines B above. This leach liquor is then returned to the sulfuric acid digester in which deposit A is being digested.

The following are further details of the above procedure:

PREPARING ACID SOLUTION OF IMPURE INDIUM (WATER LEACH RESIDUE, ETC.)

The initial solution of the impure indium—water leach residue or other material—is conducted in a two-stage process as noted above. The first stage we designate as a "neutral" leach and the second stage as an "acid" leach.

1. *"Neutral" leach*

In treating the impure indium material in the "neutral" leach, we employ the solution from the "acid" leach mentioned below and cause it to act on fresh indium-bearing material at about 180–200° F. until no more indium is dissolved, leaving a "neutral" leach residue. The solution at this point has a pH of about 1.4. The water leach residue or other impure indium material may vary in basicity, particularly according to its varying zinc content and the quantity of this impure material added to the acid leach to produce a pH of 1.4 will also vary accordingly. The pH change is sluggish and the indium content of the neutral leach residue after the treatment with the acid leach may vary widely. We have found, for instance, in treating water leach residues from the process of Patent No. 2,378,848 that the indium content of the neutral leach residue varies between about 6.8 to about 42.4% of indium. The lower figure was obtained when water leach residue was added at intervals of 4 to 6 hours to the acid leach liquor.

The finishing pH of the neutral leach liquor may be pH 1.4 to 1.6, and at such pH, some elimination of tin and antimony by hydrolysis probably occurs. After filtration and washing of the filter cake, filtrate and wash water are combined to form the original electrolyte which is to be electrolyzed to form deposit A. This electrolyte normally contains from 60 to 120 grams per liter of indium.

2. *"Acid" leach*

The "neutral" leach residue may carry as much as about 40% indium. This neutral leach residue is leached hot at about 180–200° F. with sulfuric acid to extract all the acid-soluble indium. Water leach residue is preferably added in this operation. The amount of this residue depends on the quantity and analysis of the variable neutral leach residue and may vary from 0 to 80% of the total amount leached in both the "neutral" and "acid" leach operations. The leach is controlled by following either the free acid content of the solution which at the start should be about 20–30% $H_2SO_4$, and at the finish of the acid leach should be below 100 grams per liter of acid; or the leach may be controlled in accordance with the pH at the finish, which should be at about pH 0.5 to 0.8. As noted above, the solution obtained by this acid leach is afterwards used in the "neutral" leach operation to dissolve more water leach residue. The filter cake from the "acid" leach is usually discarded. In exceptional cases it is pulped in dilute acid, 40–100 g./l. $H_2SO_4$, to extract any indium sulfate which failed to wash out in the filter press. The efficiency of the two-stage method of operation is indicated by the fact that during a series of leaches of about 1184 pounds of water leach residue, a loss was shown by this two-stage process of the indium content of only about 0.75%. The average indium content of water leach residue was about 48%.

ELECTROLYSIS TO PRODUCE DEPOSIT A

The combined filtrate and wash water from the neutral leach operation is electrolyzed at about 100° F. in lead-lined cells using insoluble lead anodes and stainless steel cathodes. The electrolysis is conducted with a current density of about 25 amps. per sq. ft. cathode area and about 2.8–3.5 cell voltage. By following the indium content of the electrolyte it has been determined that the bulk of the metal is deposited at a current efficiency of over 90% and an over-all current efficiency of about 80% has been attained repeatedly when stripping the solution to about 1 g./l. or less indium. The cathode deposit is dark and spongy, but it is sufficiently firm to adhere well to the starting sheet. A spongy deposit is advantageous for the following operation of re-dissolution for further purification.

The electrolytic deposition of indium is important to eliminate all the alkalies and the bulk of the zinc. These impurities remain in the electrolyte and are discarded at the end of the electrolysis. A typical analysis of the stripped discard electrolyte is: In = 0.5–1.2 g./l.; Zn = 5–15 g./l.; Sn = nil; As + Sb = about 0.5 g./l., and $Na_2SO_4$ = 40 to 100 g./l. The cathode deposit oxidizes partially and may contain approximately 10% of oxygen after being stored for several weeks. A typical analysis of the stored deposit is presented in the following:

|  | Per cent |
|---|---|
| In | 71.12 |
| Zn | 11.50 |
| Sn | 4.31 |
| As+Sb | .41 |
| Cu | .15 |
| Pb-appr. | .5 |
| Cd | < .2 |
| Fe | < 1.0 |
| O-appr. | 10.0 |

ELIMINATION OF IMPURITIES FROM DEPOSIT

The impurities in deposit A are eliminated by the following three steps:

1. Partially dissolve cathode deposit in acid.
2. Cementation.
3. Precipitation of indium as oxalate.

The re-dissolution of the cathode deposit and also the cementation are performed with the object of eliminating the metals more noble than indium. For this reason the impure indium is dissolved in an insufficient amount of acid. The metal charged per batch is calculated to contain about 5 kgs. of indium and zinc which is digested in 4 liters or 7.34 kgs. of 66° Bé. electrolyte grade sulfuric acid diluted 1:3 or 1:4 by volume. The lesser dilution is used with relatively massive indium metal. With the proper ratio of acid to water the heat of acid solution plus the heat of reaction between acid and metal will keep the solution at or near the boiling temperature until the dissolution of indium is almost complete. While digestions or re-dissolutions have been completed in as little as 4 hours, they are ordinarily allowed to stand 16 hours overnight. At the end of this period the digester pulp is passed through a 40-mesh screen and to a filter; the larger indium pieces being returned to the next batch in the digester, while the fine sludge is further treated as described hereafter. A typical assay of the original sludge is shown in the following: In=17.69%; Sn=27.24%; Cu=.51%; Sb=5.54%; Pb=9.65%; Zn=1.25%; $SO_4$=8.64%; balance=mainly O and OH.

The digester solution is passed through steam-jacketed cementation tubes charged with "feather" indium metal prepared as described below.

The indium consumption in the cementation tubes averages about 10% of the indium content of the liquor. This consumption and the performance of the cementation tubes are determined by:

(a) The area of surface presented by the indium mass.
(b) The flow rate of the liquor.
(c) The cementable impurity content of the liquor.
(d) The free acid content of the liquor.
(e) The purity of the indium mass.

While factor (c) can only be controlled to a slight degree in the digester, the other 4 factors are controlled in the following manner:

(a) The surface to mass ratio of the metal mass is controlled by metal temperature, preferably about 750° F. with a pouring rate of about 3 lbs. per minute when the molten indium is poured into the strongly agitated cold water at 50–70° F. The metal is produced as "feather" indium by pouring the molten indium (about 750° F.) into a vessel of about 2.5 gals. capacity full of water, strongly agitated by flow from the faucet.

(b) The flow of the liquor through the tubes is increased or decreased according to the observed gassing (liberation of hydrogen as indium dissolves) and quantity of cement sludge formed. The flow rate must be sufficiently high to wash the tubes clear of sludge and also to prevent trapped gas bubbles from blocking the flow of solution. We prefer a flow rate of 3 to 15 liters per hour using 3 tubes (¾-inch, five feet long), each containing about 300 grams of indium.

(d) The free acid content of the liquor is kept at a practical minimum by dissolving the crude cathode metal in a quantity of sulfuric acid which is insufficient to dissolve all the indium charged to the digester tank. In this manner also a large quantity of the nobler metals are rendered insoluble and a certain control of factor (c) is possible.

(e) The indium feathers have been made of whatever indium metal was available. To keep the cement sludge formation at a minimum and also to maintain clean and effective surfaces of the masses where two indium tubes are used, the second tube is loaded with feathers made of a relatively pure grade of indium—99.5% purity—while the first tube is charged with indium feathers of about 97% purity.

The liquor issuing from the cementation tubes carries a rather large quantity of cement sludge which must be filtered off before the solution, which has contained as much as 250 to 300 g./l. indium, is ready for the following operation. This sludge packs on the filter and for rapid filtration, which is necessary, a filter aid, such as diatomaceous earth should be used. Its chemical composition is similar to that of the digester sludge. It will be combined with the digester sludge for re-treatment.

The solubility of the indium oxalate precipitate varies with the acid concentration of sulfuric acid. In pure cold sulfuric acid of 66° Bé. it is practically insoluble. In 100 g./l. sulfuric acid it is soluble to the extent of about 0.3 g./l. indium, equivalent to about 0.6 g./l. indium oxalate [$In_2(C_2O_4)_3$].

The precipitation of indium oxalate is conducted in the following manner:

A nearly saturated solution of oxalic acid is prepared by adding 5.0 to 5.5 kg. of commercial oxalic acid crystals ($H_2C_2O_4.2H_2O$) to 6 liters of water. Live steam is conducted into the solution, which is mechanically agitated until the solution of the acid is complete. One-half of the batch of purified indium sulfate solution, which contains 250 g./l. indium, is then pumped or syphoned into the strongly agitated oxalic acid solution at a rate not exceeding one liter per minute. This means that the indium oxalate must be precipitated in an excess of oxalic acid which is always maintained by the slow rate of indium sulfate addition to the strongly agitated oxalic acid solution.

The second-half of purified indium sulfate solution is treated identically in another batch of oxalic acid solution.

The precipitated indium oxalate is agitated for one hour, then allowed to stand overnight before filtering. The two batches will produce about 40 liters of filtrate containing about 180 g./l. sulfuric acid, 30 g./l. oxalic acid, and 0.5 g./l. indium, along with a large proportion of the residual impurities, including lead, The conditions as outlined are quite critical. An excess of oxalic acid is maintained. The lower limit of this excess is 10-20%. If the required excess of oxalic acid is not maintained by too rapid influx of the indium sulfate solution, the indium oxalate will precipitate as a putty-like solid mass which will gradually disintegrate into loose, coarse crystals which will entrap a considerable amount of the impurity-bearing filtrate.

The following is an assay of a filtrate waste solution produced with the preferred method of adding the $In_2(SO_4)_3$ solution to the oxalic acid solution: $H_2SO_4 = 219.94$ g./l.; $H_2C_2O_4 = 91.01$ g./l.; $In = 0.33$ g./l. This filtrate indicates a 50% excess of $H_2C_2O_4$. If the indicated concentrations of the two solutions are not maintained it may take as long as three days to obtain the fine crystalline precipitate and the resulting filtrate will carry 1-1.5 g./l. indium, resulting in an indium loss in the discard filtrate which is 4-6 times higher than under the described conditions.

When the reaction is conducted as outlined in the foregoing, the precipitate forms in a semi-colloidal state but changes almost instantaneously to a fine crystalline form. In the absence of iron the filter cake will be pure white, but as little as 0.05% Fe will give it a pale yellow color. The elimination of all impurities is of the order of about 75-80%; the balance probably being mechanically entraped.

CALCINATION OF INDIUM OXALATE

Direct reduction of indium oxalate has been satisfactorily carried out by us but according to our preferred method, the $In_2(C_2O_4)_3$ precipitate is first dried at 210-250° F., and then converted to $In_2O_3$ by calcination. This conversion is readily accomplished. Occasional small lots have gone over to oxide spontaneously in an electric drying oven held at 300° F.

This calcination is preferably conducted in stainless steel pans in a gas-fired muffle furnace. Because of the bulky mass and for sake of maintaining a production schedule the temperature of the furnace is held at 1500-1600° F. This temperature should not be exceeded because at about 1800° F. the pans will scale and contaminate the oxide. The calcination is judged complete when the evolution of gas ceases. The calcination proceeds according to the following reaction:

$$2In_2(C_2O_4)_3 + 3O_2 = 2In_2O_3 + 12CO_2$$

The produced oxide has a lemon yellow color and contains ordinarily 81.0-81.5% indium, with zinc as the major impurity. The oxide thus contains 98-99% $In_2O_3$, balance primarily ZnO. A slight volatilization loss of $In_2O_3$ has been observed, but it was too small to be accurately determined. It is estimated to be approximately 1%.

TREATMENT OF RESIDUE FROM DEPOSIT A

For further digestion of the fines of the digester residue with hot sulfuric acid, a solution containing some indium, tin, lead and other impurities may be obtained and this solution may be added to the original indium sulfate solution and cemented with indium metal. It has been found more economical, however, to carry on a separate cementation using lead powder. Accordingly, as indicated in the above flow sheet, the digester residue is screened through a 40-mesh screen and the particles removed and returned to the digester. The fines are treated with sulfuric acid. The coarse material which had a metallic character and did not pass through this screen amounted to 8.4%. It had the following typical analysis which has a striking resemblance to that of the crude indium metal charged to the digester: In = 70.4%; Sn = 8.76%; Pb = 7.88%; Sb = 2.17%; Cu = .26%.

The fines from the screening operation amounted to 91.6% and had all the characteristics of finely ground matte or intermetallic compounds. The chemical analysis showed the following composition: In = 19.02%; Sn = 14.58%; Pb = 3.75%; Sb = 2.95%; Fe = 0.15%; Cu = 2.69%; Zn = 1.10%; $SO_4$ = 7.69%; the balance being diatomaceous earth, oxygen, etc.

We have found that only a slight excess over the theoretical amount of sulfuric acid is necessary to accomplish a satisfactory solution of the metal values of the digester residue. Increased addition of acid only increases the tin extraction which is not desired. We have also observed that generally the higher the proportion of lead powder to the tin to be eliminated by cementation, the greater the percentage of tin so eliminated.

The following are specific examples of the process as we now prefer to practice it. It will be understood that the examples are illustrative and that the invention is not restricted thereto except as indicated in the appended claims.

EXAMPLE 1

To an aqueous liquor containing 222 kgs. of 66° Bé. sulfuric acid and 7.5 kgs. of indium from previous acid leaching was added 227 kgs. of "neutral" leach residue from previous leaching containing 40.6 kgs. of indium. There was also added 125 kgs. of original water leach residue (obtained by practice of Patent No. 2,378,848) containing 61.3 kgs. of indium. The total indium present in this mixture was 109.4 kgs.

The batch was leached for 10 hours at about 200° F. and contained at the end of this period 110 g/l. free sulfuric acid. It was filtered and the cake, 34.5 kgs. dry weight, containing 3.5 kgs. of indium was stored for repulping in dilute sulfuric acid. The filtrate was returned to the leach tank and neutralized with 166.6 kgs. of original water leach residue containing 71.8 kgs. of indium. This batch was leached for 18 hours at 200° F., finishing at a pH fo 1.2.

These operations yielded the following products:

|  | Kgs. In |
|---|---|
| (a) 959 liters of rich liquor, containing | 82.5 |
| (b) 583 liters of wash water, containing | 11.3 |
| (c) 181.8 kgs. "neutral" leach residue containing | 70.1 |
| (d) 133 liters rich liquor, containing | 13.3 |
| (e) 34.5 kgs. "acid" leach residue containing | 3.5 |
| Total output contained | 180.7 |
| Total input contained | 181.2 |

While items (b), (c) and (d) were held to be consumed in a following treatment batch, item (a) was transferred to the electrolytic system, where the solution was stripped in two cells connected in series with a current of 710 amps. for a period of 78 hours. The temperature of the electrolyte was 105° F. and the potential drop in both cells averaged 3.1 volts.

The obtained cathode deposit weighed 104.8 kgs. and had the following assay:

| | Per cent |
|---|---|
| In | [1]77.5 |
| Zn | 11.5 |
| Sn | 4.31 |
| Cu | .15 |
| Sb | .41 |
| SO$_4$ and O$_2$ | Balance |

[1] Equivalent to 81.21 kgs. indium.

The stripped electrolyte which was discarded contained:

| | G./l. |
|---|---|
| In | [1]1.67 |
| Zn | 24.5 |
| Fe | 4.85 |
| Sn | 1.40 |

[1] Equivalent to 1.6 kgs. indium.

Total input to electrolysis=82.5 kgs. indium.
Total output of electrolysis=82.8 kgs. indium.

The cathode deposit, along with 12.43 kgs. of other metallics (+40 mesh material from a previous process) containing 11.19 kgs. indium was digested in 20 batches with a total of 80 liters of 66° Bé. H$_2$SO$_4$ and 254 liters water. The indium feathers of the cementation tubes were consumed to the extent of 8.85 kgs. indium, which also entered the indium sulfate liquor. The combined digester and cementation residues, which were put aside for treatment totaled 8.78 kgs. and contained 4.05 kgs. indium, including some metallic particles larger than 40 mesh. The analysis of the −40 mesh material showed:

In=17.69%
Sn=27.24%
Pb=9.65%
Sb=5.54%
Zn=1.25%
Cu=0.51%
SO$_4$=8.64%
Balance=substantially O and H$_2$O.

The +40 mesh material, being unconsumed particles of the metal charged, is substantially the same as the cathode deposit and was retained for digesting with further cathode deposit material.

Input to digester:

| | Kgs. In |
|---|---|
| Cathodes | 81.21 |
| Metallics | 11.19 |
| Consumed indium feathers | 8.85 |
| | 101.25 |

Output:

| | |
|---|---|
| In$_2$(SO$_4$)$_3$ solution | 97.20 |
| Digester residues | 4.05 |
| Total | 101.25 |

A total of 360 liters of In$_2$(SO$_4$)$_3$ solution was produced, averaging 270 g./l. indium, equivalent to 97.2 kgs. indium. This was treated with 221 kgs. of commercial grade oxalic acid. An unweighed quantity of indium oxalate was produced in addition to 800 liters of waste filtrate containing 288 grams indium.

On the basis of the Zn-content of the metal treated and an average assay of 1.77% Zn in the oxide produced an assay of 12.45 g./l. zinc is indicated for the discard filtrate from the oxalate precipitation. This is equivalent to 82.6% zinc elimination.

The oxalate was dried and calcined at a temperature of 700–1300° F., yielding 118.32 kgs. In$_2$O$_3$, containing 94.92 kgs. indium. The average assay was:

In=80.22%
Zn=1.77%
O=Balance

Other impurities are too low to analyze conveniently by the customary chemical methods.

The digester residue with the cementation sludge added thereto after elimination of coarser particles by screening was treated as follows:

1000 parts by weight of a batch of digester residue were treated. This material was found to contain 14.37% In and 32.31% Sn. It was leached with mechanical agitation for 6 hours at a temperature of about 170° F. in a solution of 222 parts by volume of 66° Bé. H$_2$SO$_4$ in 3000 parts by volume of water. After standing overnight the pulp was filtered and washed rapidly.

*Metal-balance of leach*

| Material | Amount | Analysis | | Distribution | |
|---|---|---|---|---|---|
| | | In | Sn | In | Sn |
| | | | | Percent | Percent |
| Heads | 1,000 pts. by wt | 14.37 | 32.31 | 100.0 | 100.0 |
| Leach Liquor | 3,330 pts. by vol | 36.39 | 40.39 | 84.4 | 41.7 |
| Leach Residue | 665 pts. by wt | 3.39 | 28.40 | 15.6 | 58.3 |

The dissolved tin which amounted to 41.7% of the original tin in the digester residue, was then cemented out with lead powder. Assuming that 90% of the tin was present in the bi-valent form; approximately twice the lead required by theory was used. This should give a lead-tin ratio in the resulting cementation residue of about 4:1.

475 parts by weight of U. S. M. R. "Superfine" Lead Powder (about 95% through a 325-mesh sieve) were added to the leach liquor and allowed to react overnight (16 hours) on the hot-plate with mechanical agitation. The pulp was then filtered and washed with ease.

*Metal-balance of cementation*

| Material | Amount | Analyses | | Distribution | |
|---|---|---|---|---|---|
| | | In | Sn | In | Sn |
| | | | | Percent | Percent |
| Heads | [2]3,220 | 36.39 | 40.39 | 100.0 | 100.0 |
| Cementation Filtrate | [2]3,105 | 39.69 | 2.11 | 100.0 | 4.9 |
| Cementation Residue | [1]763 | tr. | 16.65 | | 95.1 |

[1] Parts by weight. [2] Parts by volume.

This treatment of 1000 parts by weight of digester residue resulted in a tin elimination in the first step of 58.3%; while the second step eliminated 95.1% of the tin dissolved with the indium. The overall tin elimination in both steps of the treatment amounted to 98.1%, with an indium recovery of 84.4%.

EXAMPLE 2

To 565 liters of wash water containing 16.6 g./l. In, or 9.4 kgs. total In, acidified with 133.6 kgs. of 66° Bé. H$_2$SO$_4$, was added 134.5 kgs. of water leach residue containing 62.5 kgs. of indium obtained by the process of Patent No. 2,378,848. This addition was sufficient to bring the pH to 1.24 in 20 hours of leaching at 190–200° F.

Note that no acid leach was conducted on this material. The products of the filtration were:

|  | Kgs. In |
|---|---|
| (a) 750 liters rich liquor, containing | 56.3 |
| (b) 90.9 kgs. "neutral" leach residue, with | 7.2 |
| (c) 428 liters wash water, containing | 8.5 |
| Total output | 72.0 |

Input:

|  | Kgs. In |
|---|---|
| (a) In-content of original wash water = | 9.4 |
| (b) Water leach residue = | 62.5 |
| Total | 71.9 |

458 liters, containing 34.4 kgs. indium of item (a) were electrolyzed. The electrolysis, which ran for 38 hours with 516 amps. in two deposition cells, yielded 37.98 kgs. cathode deposit, assaying 89.0% indium, equivalent to 33.8 kgs. indium.

A portion of 3.32 kgs. of the cathode deposit was withheld and the remaining 35.66 kgs. containing 31.7 kgs. indium was digested in a group of 14 batches. The following materials were also worked up in this group:

|  | Kgs. In |
|---|---|
| (a) 38.4 kgs. of cathodes from a previous run, with | 33.0 |
| (b) 10.24 kgs. impure metal, with | 9.4 |
| (c) Indium feathers in cementation tubes, with | 7.6 |

The total amount of indium treated was, therefore, 81.7 kgs.

A total of 55.5 liters of 66° Bé. acid was used along with 182 liters of tap-water.

The $In_2(SO_4)_3$ liquor produced amounted to 252 liters containing 302 g./l. indium, or 76.10 kgs. indium.

The combined digester and cementation sludges weighed 11.47 kgs., and contained 5.74 kgs. indium. It was treated as in Example 1.

The indium content of the sulfate liquor was precipitated with 259 liters of solution containing 140 kgs. of commercial oxalic acid. A total of 184 grams indium was discarded with the waste filtrate from this precipitation.

The indium oxalate was calcined, yielding 93.02 kgs. $In_2O_3$ with an average In-content of 80.3%, equivalent to 74.7 kgs. In.

Summary:

|  | Kgs. In |
|---|---|
| Total input | 81.7 |
| Output: |  |
| 93.02 kgs. $In_2O_3$ | 74.7 |
| Waste filtrate | .184 |
| Digester sludge | 5.740 |
| Calcining and other losses | 1.076 |
| Total | 81.700 |

The expression "alkali metal" as used in the appended claims is intended to include the usual alkali metals as well as the ammonium radical which is usually considered as equivalent to the alkali metals.

We claim:

1. A process for purifying indium material which comprises, electrolyzing a sulfuric acid solution containing indium and zinc and at least one other metallic impurity precipitable from the solution by metallic indium, depositing impure indium containing such zinc and impurity, dissolving said indium and impurities in sulfuric acid to produce a solution containing indium and such impurities, precipitating a large part of such other impurity from said solution by metallic indium to produce a solution having a sufficient pH to maintain the indium, zinc and other impurity in solution, precipitating the indium from said solution with oxalic acid, and recovering indium oxalate substantially free from impurities.

2. Process for purifying indium material which comprises preparing a solution of impure indium containing zinc in sulfuric acid at a pH sufficient to maintain said indium and zinc in solution and precipitating the indium therefrom as oxalate in substantially pure form.

3. Process for purifying indium material which comprises, preparing a sulfuric acid solution of impure indium containing zinc at a pH sufficient to maintain said indium and zinc in solution, adding said solution to oxalic acid and precipitating the indium as oxalate substantially free from zinc.

4. Process for purifying indium material which comprises, dissolving in sulfuric acid impure indium containing at least one metal impurity precipitable from solution by metallic indium to produce a solution having a sufficient pH value to maintain the indium and impurity in solution, precipitating such impurity in large part by metallic indium and precipitating the indium as oxalate substantially free from said impurity.

5. A process for purifying indium material which comprises, dissolving impure indium containing at least one of the impurities, zinc, lead, tin, copper and antimony, in sulfuric acid, at a pH of not over about pH 1.6, precipitating a large part of such impurities except zinc by cementation with metallic indium and precipitating the indium with oxalic acid from the resulting solution as indium oxalate substantially free from such zinc and other impurities.

6. Process for purifying indium material which comprises, dissolving in sulfuric acid an indium sulfur compound containing as impurity at least one of the following metals, zinc, lead, tin, copper, antimony and alkali metal, electrolyzing the solution to produce metallic indium containing some of said impurity, but substantially free from said alkali metal, dissolving the indium containing said impurity in sulfuric acid solution, bringing the solution thereof in contact with metallic indium thereby precipitating some of said impurity, combining the solution containing indium and some remaining impurity with oxalic acid, said solution prior to combining with oxalic acid being at a pH sufficient to retain the indium and remaining impurity in solution, and precipitating indium oxalate substantially free from such impurity.

7. Process for purifying indium material which comprises, dissolving in hot sulfuric acid an indium sulfur compound containing as impurity at least one of the following metals, lead, zinc, tin, copper, antimony and alkali metal, at a pH of not over about pH 1.6, electrolyzing the heated solution to produce metallic indium containing at least some of said impurity, but substantially free from said alkali metal, dissolving the indium in sulfuric acid containing said impurity, bringing the solution thereof in contact with metallic indium thereby precipitating some of said impurity, heating said solution and adding the solution to oxalic acid to precipitate indium oxalate substantially free from such impurity.

8. A process for producing indium oxide, which comprises leaching a water insoluble indium residue containing indium, zinc, tin, antimony and lead and small amounts of iron and copper with sulfuric acid at about 200° F. to produce an impure indium sulfate solution, at a pH of not over about pH 1.6, electrolyzing the indium sulfate solution at about 105° F. to remove alkali and deposit indium along with some zinc, tin, antimony, lead and copper, redissolving the deposit in sulfuric acid, removing the tin, lead and antimony by cementation, heating the resulting solution and adding it to oxalic acid to precipitate indium oxalate, filtering to remove indium oxalate from unprecipitated impurities and calcining the indium oxalate.

9. A process for purifying a solution obtained by dissolving in sulfuric acid a residue containing indium with tin, lead and antimony but substantially no alkali metal as impurities and small amounts of copper and iron, said solution having a pH of not over about pH 1.6, adding to the solution lead powder and cementing out tin, copper and antimony, leaving indium sulfate solution containing indium and a small part of such impurity and precipitating the indium sulfate as indium oxalate substantially free from said impurity.

MAX F. W. HEBERLEIN.
HARRY UDIN.

REFERENCES CITED

The following references are of record in the file of this patent:

UNITED STATES PATENTS

| Number | Name | Date |
|---|---|---|
| 168,680 | Sutton | Nov. 11, 1875 |
| 192,113 | Cooper | June 19, 1877 |
| 1,539,714 | Christensen | May 26, 1925 |
| 1,886,825 | McCutcheon | Nov. 8, 1932 |
| 2,099,325 | Zellmann | Nov. 16, 1937 |
| 2,378,848 | Heberlein | June 19, 1945 |
| 2,384,610 | Doran et al. | Sept. 11, 1945 |
| 2,386,081 | Archibald | Oct. 2, 1945 |

OTHER REFERENCES

Treadwell-Hall, Analytical Chemistry, vol. 1, pp. 383 and 385. Seventh English edition, 1930. Published by John Wiley and Sons, N. Y.

Moeller: Journal of the American Chemical Society, vol. 62, pp. 2444–6 (1940).

Royer, Industrial and Engineering Chemistry, Analytical Edition, vol. 12, pp. 439 and 440.

Mellor: Inorg. & Theoret. Chem., vol. 5, (1924), page 394; pub. by Longmans, Green and Co., London.

Certificate of Correction

Patent No. 2,526,354

October 17, 1950

MAX F. W. HEBERLEIN ET AL.

It is hereby certified that error appears in the printed specification of the above numbered patent requiring correction as follows:

Column 5, line 17, after the word "DEPOSIT" insert $A$; column 8, line 53, for "fo" read *of*; column 11, line 22, for "3.32 kgs." read *2.32 kgs.*; and that the said Letters Patent should be read as corrected above, so that the same may conform to the record of the case in the Patent Office.

Signed and sealed this 30th day of January, A. D. 1951.

[SEAL]

THOMAS F. MURPHY,
*Assistant Commissioner of Patents.*